Feb. 6, 1945. C. A. LINDEMAN, JR 2,368,933
INTERNAL-COMBUSTION ENGINE
Filed Aug. 10, 1942
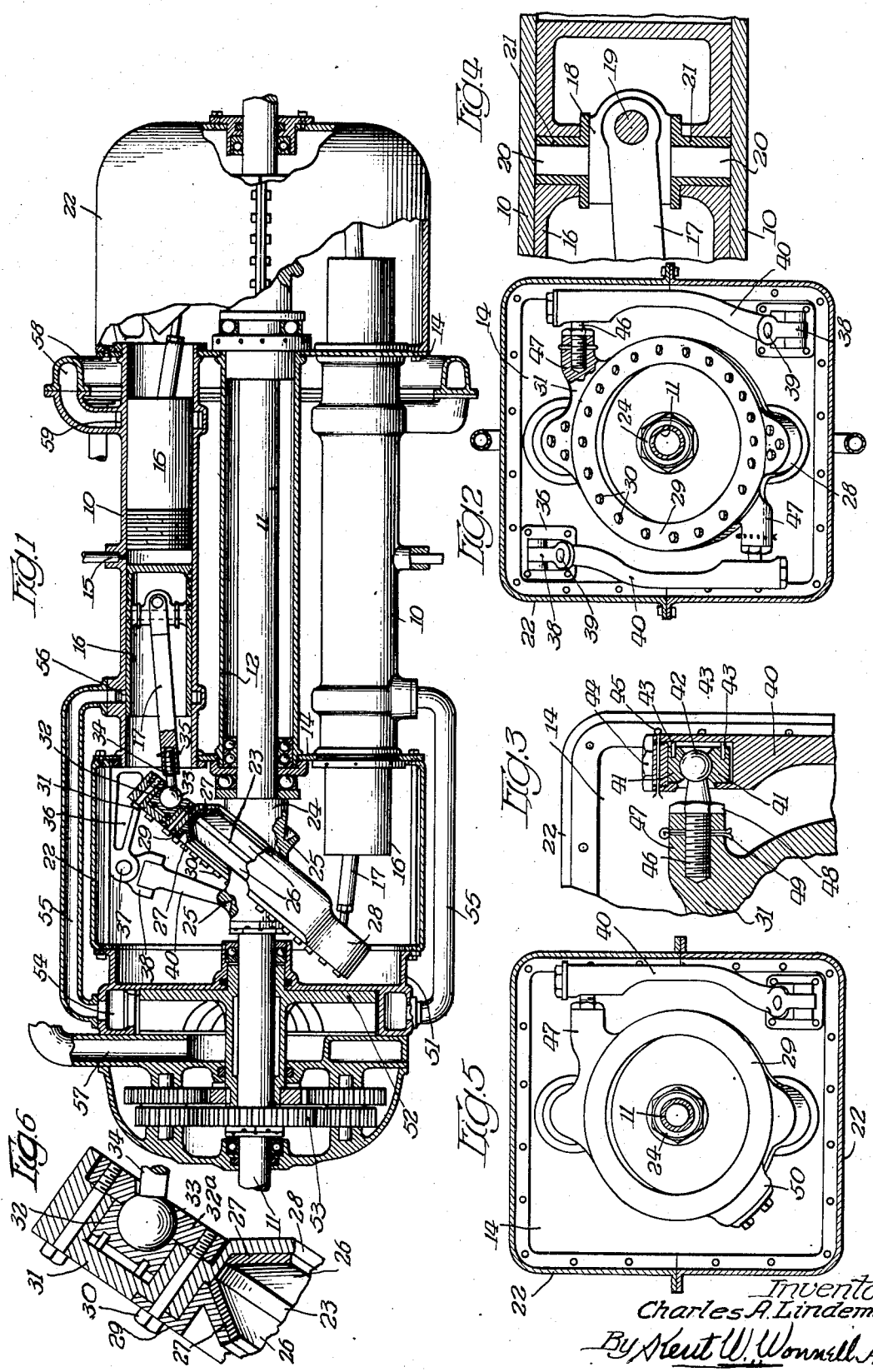
Inventor
Charles A. Lindeman Jr.
By Kent W. Wonnell Atty.

Patented Feb. 6, 1945

2,368,933

UNITED STATES PATENT OFFICE 2,368,933

INTERNAL-COMBUSTION ENGINE

Charles A. Lindeman, Jr., Maywood, Ill.

Application August 10, 1942, Serial No. 454,250

11 Claims. (Cl. 74—60)

This invention relates in general to a swash plate engine of the balanced, two-cycle opposed uniflow scavenging type having opposite pairs of cylinders for each plate.

Engines of this type are particularly designed and intended for use where engines of high horsepower and small diameter are desirable for use in small compact spaces as, for example, in aircraft.

Important objects of the invention are; to provide a lighter engine of high power by using a uniflow scavenging double piston two-cycle principle and construction of the swash plate type for the elimination of counter balances for individual pistons; to provide pistons sufficiently long to cover the intake and exhaust ports when the pistons are in firing position, thereby eliminating lubrication difficulties; to utilize a long stroke piston with a relatively short connecting rod, thus permitting a cylinder of minimum bore, thereby reducing piston area and eliminating heavy connecting rods; to provide balanced swash plate connections for the piston rods, minimizing the side motions thereof and the wear on bearings and cylinders; to control the movements of the connecting rods and confine them to the movement of the swash plate in a limited diameter, thus confining the design to a small diameter and permitting streamlining of the engine for use in a limited space; and in general to produce the engine herein shown and described.

Other objects of the invention will appear in the specification and will be apparent from the accompanying drawing in which Fig. 1 is a side elevation partly in section of an engine in accordance with the principles of this invention;

Fig. 2 is a section taken on the line 2—2 of Fig. 1;

Fig. 3 is an enlarged detail showing one of the connections in Fig. 2;

Fig. 4 is an enlarged sectional view of one of the piston rod connections;

Fig. 5 is a view similar to Fig. 2 showing a modification of the swash plate connection; and Fig. 6 is a larger view of the ball joint of Fig. 1.

This invention is described as applied to a two-stroke type of Diesel engine having a central fuel inlet in each cylinder between two movable pistions connected to oppositely inclined swash plate casings, the plates being secured to and rotatable with the power shaft. The connection includes a casing movable on and providing a bearing for the swash plate or disc, to which the ends of the piston rods are connected by universal joints, and the movement of the casing is limited or restrained by anchored retaining arms or a balance arm.

Referring now more particularly to the drawing, a plurality of cylinders, only two opposite ones being shown, are arranged about a power shaft 11 which may be enclosed and spaced from the cylinders by a shaft housing 12. At the ends the cylinder and housing may be spaced apart and held in place by end plates 14.

A fuel inlet 15, intermediate the ends of each cylinder, admits fuel in timed relation between oppositely movable pistons 16 therein, each of which has an elongated trunk, or skirt and a piston rod 17 extending therefrom and movable through the open end of the cylinder. A universal connection is preferably provided between the piston and its piston rod comprising a bushing box 18 in which the end of the rod is pivoted upon a cross-pin 19 to swing laterally in the piston, with a bearing pin 20 extending transversely of the piston and at right angles to the pin 19, the pin 20 and the bearing box being mounted in a bearing 21.

At each end of the cylinders is a crank case 22 for enclosing a swash plate disc 23 which is secured to or formed integrally with a sleeve or hub 24 adapted to be mounted upon and secured to the power shaft 11, each swash disc having opposite center bores 25 which indicate the angle of the disc to the shaft.

Each swash disc preferably has two outer inclined or edge bearing surfaces 26 forming enlarged surfaces for bearings 27 which are secured in place by inner and outer casing members 28 and 29, the latter being in the form of a ring and having a number of fastening bolts 30 for securing them together. A bearing block 31 is also secured to or extended from one of the casing members at the periphery thereof and includes a recess for a bearing 32 and a removable plate 32a secured by bolts 30 for enclosing therebetween a bearing ball 33 at the end of a stem 34 threaded into the end of a piston rod 17 and secured thereto in any adjusted position as by means of a cotter pin 35.

Secured to one side or to opposite sides of each end holding plate 14 is an anchor arm 36 with a transverse pivot 37 between bifurcated ends at its outer extremity approximately midway of the disc 23 and a bracket or holder 38 is mounted thereon having projecting arms and a pivot 39 extending therethrough at right angles to the pivot 37 upon which one end of a swash disc retaining arm 40 is mounted to have a limited universal mounting at this end. At the other end of the retaining arm is a recess for receiving bearings 41 for a ball 42 with pins 43 to prevent the bearings from turning, and a threaded end cap 44 secured in place in the end of the arm by a cotter pin 45. The bearing ball 42 is at the end of a threaded stem 46 inserted into a boss 47 projecting from the connecting ball rod bearing 31 and held securely in any adjusted position by a lock nut 48 and a cotter pin 49.

If only one swash plate casing retaining arm 40 is used as shown in Fig. 5, an opposite counterbalance weight 50 is substituted without materially affecting the operation and movement of the connected parts.

With this construction and arrangement, each piston rod and the swash plate enclosing casing are mounted and connected for limited universal movement, the swash plate casing is confined to a limited movement by the arm or arms 40 and each piston has a long stroke as determined by the angularity of the swash disc, with a very limited angular throw of each piston rod as determined by the innermost and outermost positions thereof as shown in Fig. 1. Furthermore, no cranks, crank weights or counter-balances are required for each individual piston.

At one end of the power shaft is an extension 51 of the crank casing for receiving a pump impeller 52 and a gearing 53 for operating the impeller. At the periphery of the impeller is an air chest or manifold 54 with pipes 55 leading therefrom to inlet ports 56 uncovered by the pistons 16. Connecting with the central or inlet portion of the impeller is an air inlet pipe 56.

At the opposite end of the cylinders 10 is an exhaust manifold 58 connected with each cylinder by exhaust ports 59 which are also uncovered by the adjacent pistons 16 in their outer movement from the center.

In the engine operation, air is drawn through the intake and discharged under pressure by the impeller through the manifold 54 and then in timed relation through the cylinders in succession, if there are a plurality of them, as the inlet and outlet ports 56 and 59 are uncovered. Upon the inward movement of the opposite pistons 16, residual air will be compressed between them, and fuel under pressure is admitted through the nozzle 15 in proper timed relation to cause an explosion between the pistons forcing them outwardly.

By providing the opposite centers 25 at right angles to the swash disc, it may be removed from the power shaft and easily set up and centered in a suitable machine for truing the bearing surfaces 26, if they should become worn. It will also be noticed that by having the bearing surfaces 26 at opposite edges of the disc and substantially at right angles to each other, the full pressure from the connecting rods is against one of the bearing surfaces at its limiting position, depending upon the relative direction of movement of the piston rod.

The length of the stroke is the difference along the shaft between the connections of the upper and lower piston rods to the swash plate casing which equals substantially the full length of the swash plate mounting hub or sleeve 24. This causes a longer application of power and results in a light compact engine of high horse-power adapted to be used in tanks, aircraft, or wherever space is at a premium.

The holding or restraining arm is attached to the case by a limited universal connection in order to permit a slight weaving or rocking movement of the swash plate and at the same time to hold the casing against rotation therewith and to prevent counter rotation, all of which tends to insure that the pistons can be accurately adjusted with respect to the swash disc, insuring proper timing and proper application of power thereto. A firm and substantial holder is necessary because the entire thrusting power of the cylinders is transmitted through the casing to the swash plate and always at an angle to the latter, thereby causing a substantial frictional engagement at the bearings 27 which tends to rotate the casing with the swash plate. This construction eliminates a cross-head for the outer end of each piston rod, and also eliminates a complicated oiling connection and an individual counter-balancing connection between each piston rod and the swash plate.

I claim:

1. In an engine of the swash plate type, a swash disc inclined to and rotatable with the power shaft, a casing bearing within which the disc is rotatable, and means for restraining the casing bearing against counter-rotation with the disc comprising an arm having a double pivotal connection at one end, a fixed support for said connection, and a limited universal connection with the bearing casing at the other end.

2. In an engine of the swash plate type, a swash disc inclined to and rotatable with the power shaft, a bearing casing in which the disc is rotatable, power piston connections with the casing, and counter-rotation restraining means for the casing comprising a fixed support, bearing pivots at right angles to each other in the support, an arm having one end mounted to swing upon said pivots, and a universal connection at the other end of the arm for connecting it to the bearing casing.

3. An engine of the swash plate type having a swash disc inclined to and rotatable with the power shaft, a bearing casing in which the disc is rotatable, power pistons and means connecting each piston with the casing, and counter-rotation restraining means for the casing comprising a fixed support, an arm having a relatively fixed double pivotal connection at one end with said support, and a limited universal connection with the bearing casing at the other end.

4. In an engine of the swash plate type, a swash disc inclined to and rotatable with the power shaft, a bearing casing in which the disc is rotatable, means for holding the casing against rotation relative to the disc, the swash disc and the cover having inclined bearing portions substantially at right angles to each other at opposite edges of the disc, a plurality of power pistons, and connecting means between each piston and the bearing cover substantially normal to the two bearing surfaces at opposite limits of its travel, said means including a limited universal connection with the piston and with the cover.

5. In an engine of the swash plate type, a swash disc inclined to and rotatable with the power shaft, a bearing casing in which the disc is rotatable, means including universal connections for holding the casing against rotary movement relative to the disc, a plurality of power pistons, and connecting means between each piston and bearing casing comprising a rod having a double pivotal connection with the piston at one end and a limited universal connection with the casing at the other end.

6. In an engine of the swash plate type, a swash disc inclined to and rotatable with the power shaft, the outer edges of the disc being beveled to provide increased bearing surfaces at an angle to each other, a bearing casing having opposite side parts engaging the inclined edges in which the disc is rotatable, pistons and piston rods extending therefrom having universal connections with the casing, a restraining arm for holding the casing against rotation having a fixed double pivotal connection at one end and a limited universal connection with the casing at the other end.

7. In an engine having a swash disc inclined to and rotatable with the power shaft, a bearing casing in which the disc is rotatable, means including universal connection for holding the casing against rotation, a projection from the casing having a bearing recess therein, a plurality of power pistons movable parallel to the shaft, connecting rods between the pistons and the bearing casing, a universal connection between each piston and its connecting rod, and a limited universal connection between the other end of the connecting rod and the swash disc casing comprising a bearing ball at the end of the connecting rod, a bearing member engaged by the ball and seated in the bearing recess, and a confining plate seating the ball against the bearing member in the recess.

8. In an engine having a swash disc inclined to and rotatable with the power shaft, a bearing casing in which the swash disc is rotatable having opposite side parts secured together, bearing projections extending from the outer sides of the casing each having a bearing recess therein, pistons and piston rods extending therefrom having universal connections with each other and with the bearing recess of the casing, said connections comprising a bearing member seated in the recess, a bearing ball adjustable at the end of each piston rod and engaging the bearing, an outer perforated ball holding plate also seated in the recess, and fastening means from the projection for holding the bearing member and plate in position.

9. In an engine having a swash disc inclined to and rotatable with the power shaft, a bearing casing in which the disc is rotatable, pistons and piston rods extending therefrom having limited universal connections with each other and also with the casing, a bearing projection for each piston rod extending outwardly from the casing and having a bearing recess therein, a ball joint between each piston rod and its bearing projection comprising a stem adjustably threaded into the piston rod having a bearing ball at its outer end, a bearing block in the recess of one of the bearing projections engaged by the ball, a retaining plate also seated in the bearing recess for holding the bearing ball against its bearing, and fastening means for securing the plate and bearing ball in position.

10. In an engine of the swash plate type, a plurality of cylinders arranged parallel with the power shaft, a pair of swash discs one at each end of the cylinders secured to and rotatable with the power shaft, a bearing casing in which each swash disc is rotatable, pistons in each cylinder and means connecting them through the open end of the cylinder to one of the swash disc casings, and means for restraining each bearing casing from rotary movement with the disc comprising a guide arm having a relatively fixed double pivotal connection at one end and a limited universal connection with the casing at its other end.

11. In an engine of the swash plate type, a plurality of cylinders arranged parallel to and surrounding the power shaft, bearing plates for the cylinders and crank cases attached thereto at the ends of the cylinders, oppositely inclined swash plates attached to and rotatable with the power shaft, one in each crank case, a bearing casing in which each swash plate is rotatable, a piston in each end of each cylinder, a connecting rod having a fixed pivotal connection with the piston at one end and a limited universal connection with the adjacent casing at the other end, and means for restraining each bearing casing from rotation with its swash disc comprising an arm having a fixed support connected with the spacing plate at each end of the cylinders, a fixed double pivotal connection between one end of the arm and the support and a limited universal connection at the other end of the arm with the casing.

CHARLES A. LINDEMAN, Jr.